UNITED STATES PATENT OFFICE.

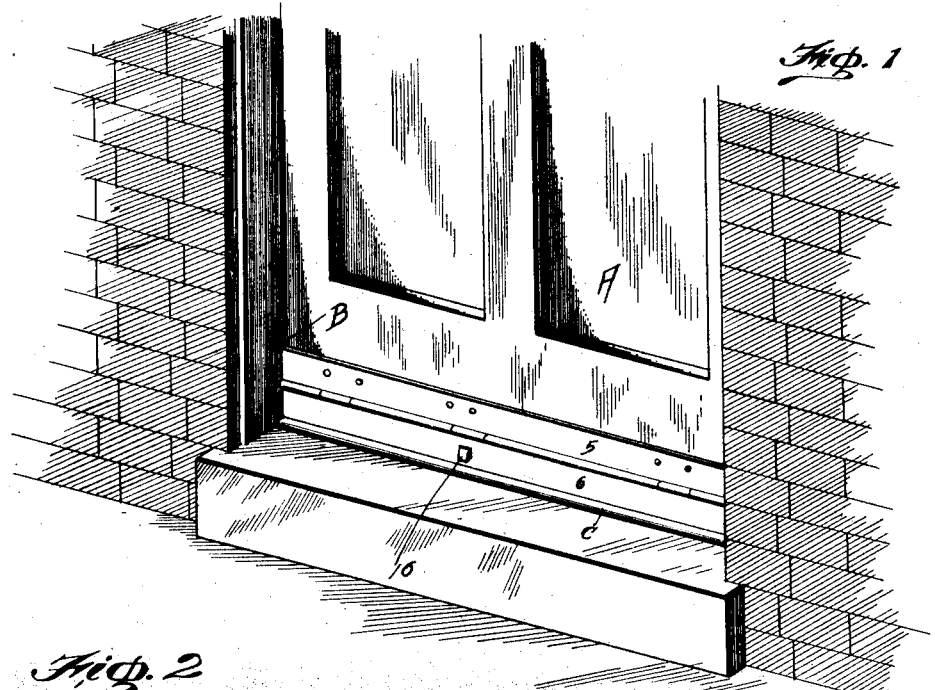
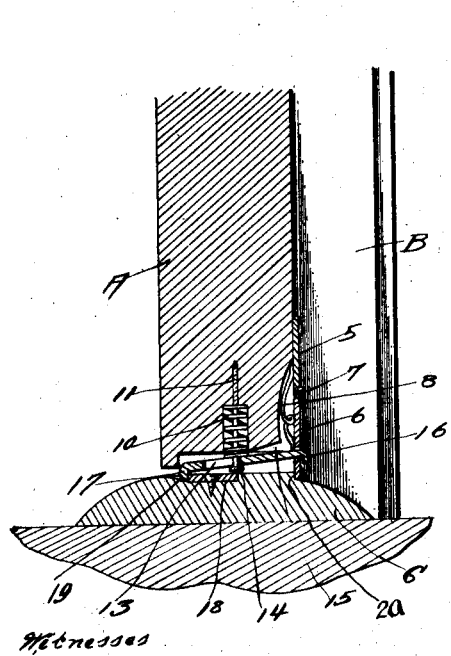
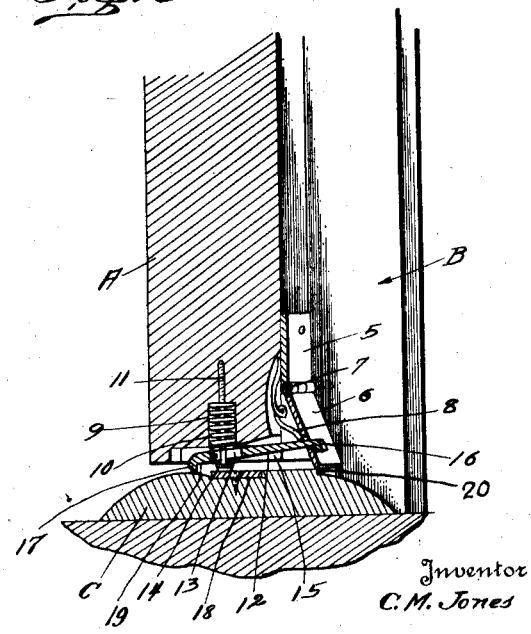

CLYDE M. JONES, OF SACRAMENTO, CALIFORNIA.

WEATHER-STRIP.

1,401,409.   Specification of Letters Patent.   Patented Dec. 27, 1921.

Application filed January 23, 1918. Serial No. 213,346.

*To all whom it may concern:*

Be it known that I, CLYDE M. JONES, a citizen of the United States, residing at Sacramento, in the county of Sacramento, State of California, have invented certain new and useful Improvements in Weather-Strips; and I do hereby declare the following to be a full, clear, and exact description of the invention, such as will enable others skilled in the art to which it appertains to make and use the same.

The invention relates to a weather strip, and more particularly to the class of automatically operated weather strips for doors or the like.

The primary object of the invention is the provision of a weather strip of this character wherein the same will effectively operate automatically on the closing of the door to exclude rain, snow and wind from entering under the door.

Another object of the invention is the provision of a weather strip of this character, wherein the construction thereof is novel in form for the positive automatic operation thereof when the door is swung to open or closed positions, the arrangement of the parts being such as to reduce the possibility of the same getting out of order.

A further object of the invention is the provision of a weather strip of this character, which possesses simplicity of construction, and is capable of being readily and easily applied to or removed from a door, thoroughly reliable and efficient in its purpose and operation, and inexpensive to manufacture.

With these and other objects in view, the invention consists in the features of construction, combination and arrangement of parts, as will be hereinafter fully described, illustrated in the accompanying drawing and pointed out in the claims hereunto appended.

In the accompanying drawing:—

Figure 1 is a fragmentary perspective view showing the lower portion of a door frame and door, with the weather strip constructed in accordance with the invention applied to the door which is in closed position, Fig. 2 is a fragmentary vertical central sectional view showing the door in position as shown in Fig. 1, Fig. 3 is a view similar to Fig. 2 showing the door partly open.

Similar reference characters indicate corresponding parts throughout the several views in the drawing.

Referring to the drawing in detail A designates a portion of a swinging door B a portion of the door frame and C the threshold strip on the base of the door frame for the door as usual.

Mounted on the outer side of the door near the lower or bottom edge thereof is a weather strip comprising an upper hinge like stationary leaf plate 5 and a lower swinging leaf plate 6 which is supported upon a pintle 7 swingingly connecting the said lower plate to the upper plate and this lower plate 6 when the door A is closed abuts the threshold strip C so as to exclude rain, snow or wind from entering beneath the lower edge of the door as will be apparent from Figs. 1 and 2 of the drawing.

The plates 5 and 6 of the weather strip extend crosswise of the door A between the jamb or stop pieces of the door frame B and suitably mounted between the door A and the weather strip is a spring 8 which is designed to play against the lower plate 6 to swing the same outwardly and upwardly for clearing the threshold strip C when the door A is opened.

Formed centrally of the door and opening through the lower edge thereof is a socket or recess 9 in which is held a coil expansion spring 10 which surrounds a headed pin 11 which is made fast in the door and extends centrally through the socket or recess 9 and has hung thereon a trip lever 12 which is formed with an intermediate longitudinal slot 13 for the pin 11 so that the lever 12 is supported upon the pin 11 for slight play or movement transverse to the door while the spring 10 acts upon said lever to normally hold the same against the head 14 of the pin 11 which head serves as a stop to limit the downward movement of the lever.

The door A is formed with a suitable channel or groove 15 for accommodating the lever 12, which is loosely connected at its outermost end at 16 with the swinging plate 6, while the inner end of said lever is formed with a tripping head or extension 17 to coact with an abutment plate 18 mounted on the threshold strip C and forming a shoulder thereon and with an inclined or beveled surface 19 formed in the said threshold strip C for the automatic operation of the weather strip when the door closes to bring the lower plate 6 against the threshold strip C to close the gap between the door and threshold strip and when the door opens to allow the plate 6 to swing upwardly for clearing the threshold strip and thereby not interfere with the opening of the door.

In the operation of the weather strip assuming that the door is being closed the lower swinging plate 6 of said weather strip is in normal elevated position to clear the threshold strip and the spring 10 is active upon the lever 12 to project the same for bringing the head 17 thereof into the path of the abutment plate 18 so that the lower plate 6 will be lowered automatically by a slight inward pull upon the lever 12 when the head 17 engages the abutment plate 18 to exclude rain, snow or wind from entering under the door when closed. When the door is finally closed, the head 17 has engaged the abutment plate which tilts the lever 12 and causes it to draw the plate 6 snugly against the stop 20.

On the initial opening of the door A the lever 12 momentarily remains stationary while the door swings slightly inwardly in the door frame thereby permitting the lower plate 6 of the weather strip to swing upwardly under the action of the spring 8 and on the further opening of the door the head 17 of the lever 12 slides up the beveled or inclined surface 19 against the resistance of the spring 10 and off the threshold strip C whereupon the said spring 10 immediately projects the lever 12 so that the same will be in a position to engage the abutment plate 18 as the door closes to automatically lower the lower plate 6 of the weather strip when said door completely closes.

From the foregoing it is thought that the construction and manner of operation of the weather strip will be clearly understood and therefore a more extended explanation has been omitted.

What is claimed is:—

1. A weather strip comprising a hinged plate supported for swinging movement, means to hold said plate outwardly in an inclined position, a lever loosely connected to the plate and having a longitudinal slot therein, a pin movably supporting said lever and extending through said slot, a spring surrounding said pin normally holding said lever downwardly disposed, said lever having an engaging end designed to abut a shoulder whereby to cause said plate to be drawn to a vertical position upon the closing of a door to which said plate is connected, opposite movement of the door permitting the plate to return to an outward position.

2. The combination with a hinged door and a threshold strip provided with a recess and with a shoulder at the inside thereof, the strip having a stop at the outside; of a plate secured to the front face of the door and having a second plate hinged thereto, a spring carried by the door and holding said hinged plate upward so as to clear the threshold strip, said door having a bottom recess, a pin engaged in said bottom recess, a spring in the recess surrounding the pin, a lever having one end connected to the hinged plate and provided with a longitudinal slot receiving the pin therethrough, said pin being provided with a head limiting the downward movement of the lever, and a tripping head at the inner end of the lever for engagement with the shoulder when the door is closed, whereby the hinged plate will be drawn toward the stop upon final closing of the door, the door moving independently of the lever, said lever riding upwardly and forwardly when the door is opened to permit the swinging plate to move to a normal position whereby to clear the stop and threshold strip.

In testimony whereof I affix my signature, in the presence of two witnesses.

CLYDE M. JONES.

Witnesses:
J. L. ARBOGAST,
E. D. WILSON.